United States Patent
Toncelli

(12) 
(10) Patent No.: US 6,773,641 B1
(45) Date of Patent: Aug. 10, 2004

(54) METHOD OF PRODUCING SLABS OF GRANULATED STONE MATERIALS AND/OR SAND BOUND WITH A HARDENABLE RESIN AND A SHAPED SHEET FOR THE PRODUCTION CONCERNED

(76) Inventor: Luca Toncelli, Viale Asiago 34, I-36061 Bassano del Grappa, Vicenza (IT)

( * ) Notice: Subject to any disclaimer, the term of this patent is extended or adjusted under 35 U.S.C. 154(b) by 0 days.

(21) Appl. No.: 09/509,045

(22) PCT Filed: Oct. 21, 1998

(86) PCT No.: PCT/EP98/06984

§ 371 (c)(1),
(2), (4) Date: Mar. 21, 2000

(87) PCT Pub. No.: WO99/21695

PCT Pub. Date: May 6, 1999

(30) Foreign Application Priority Data

Oct. 27, 1997 (IT) ..................................... TV97A000148

(51) Int. Cl.⁷ ............................. B28B 1/08; B29C 13/00
(52) U.S. Cl. ........................... 264/71; 264/69; 264/102; 264/109; 264/122
(58) Field of Search ........................... 264/69, 71, 102, 264/109, 122

(56) References Cited

U.S. PATENT DOCUMENTS 5,928,585 A * 7/1999 Toncelli ....................... 264/71

FOREIGN PATENT DOCUMENTS

| EP | 0 786 325 | 7/1997 |
| FR | 1496341 | 12/1967 |
| WO | 92/10349 | 6/1992 |

* cited by examiner

Primary Examiner—Stephen J. Lechert, Jr.
(74) Attorney, Agent, or Firm—Birch, Stewart, Kolasch & Birch, LLP

(57) ABSTRACT

The method of producing slabs made of granulated stone and/or sand bound with a hardenable resin by compaction under vacuum and subsequent hardening in which before the vibratory compaction the mixture is spread to a uniform thickness on a support, the support being protected by highly resilient sheet material. A lower sheet material has a shaped configuration comprising a flat base and a peripheral frame projecting from the flat base for a predetermined height so as to define a seat of dimension corresponding in plan to those of the slab to be produced. The peripheral frame having a height which is lower by a predetermined amount than that of the final slab produced.

17 Claims, 4 Drawing Sheets

U.S. Patent    Aug. 10, 2004    Sheet 1 of 4    US 6,773,641 B1
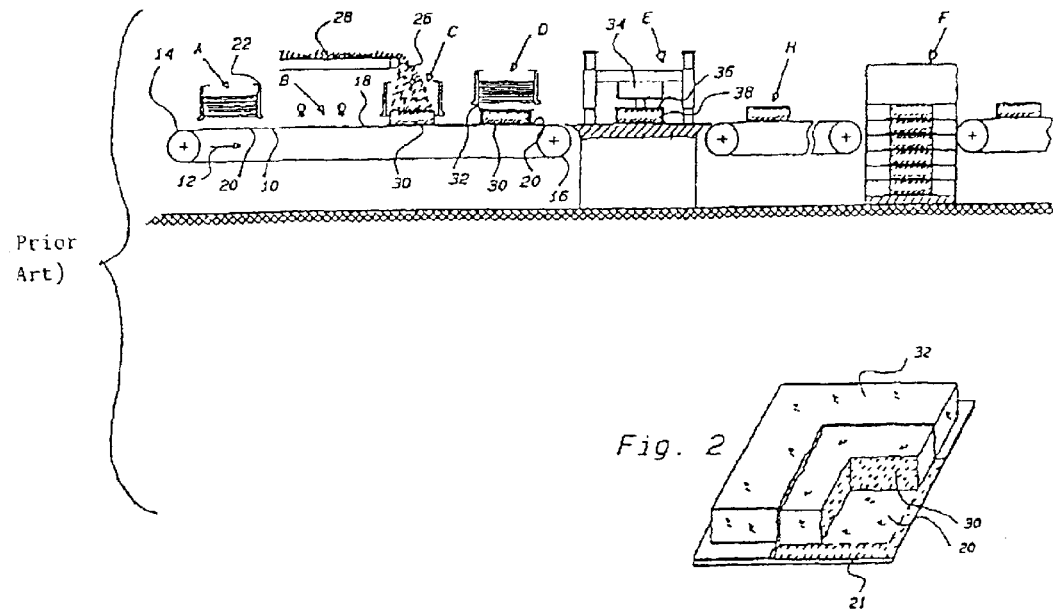
Fig. 1 (Prior Art)
Fig. 2
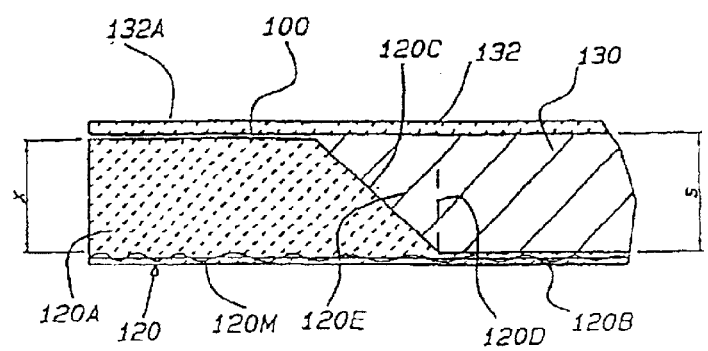
Fig. 3
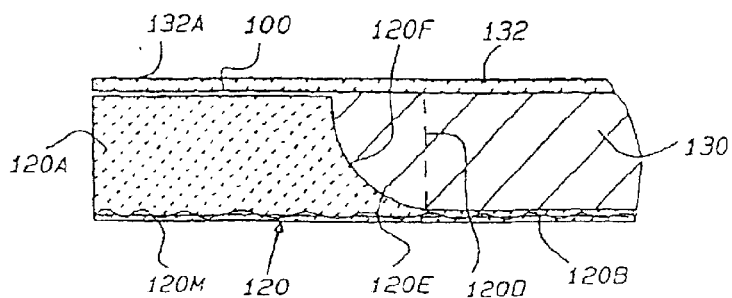
Fig. 4

METHOD OF PRODUCING SLABS OF GRANULATED STONE MATERIALS AND/OR SAND BOUND WITH A HARDENABLE RESIN AND A SHAPED SHEET FOR THE PRODUCTION CONCERNED

This application is a 371 of PCT/EP98/06984 filed Oct. 24, 1998.

The present invention relates to the production of slab products made of a granulated stone material or sand bound with a hardenable resin and, more specifically, to an improvement in the production line thereof.

The method of producing these slabs to which the present invention relates is the method according to which a mixture constituted by granulated material of a selected size and by synthetic resin is deposited in metered quantities on a conveyor belt which is advanced to a forming station (in which the mixture is subjected to a compaction operation under vacuum with simultaneous application of a vibration of predetermined frequency) and subsequently to a station in which the resin is hardened (preferably by the action of a catalyst and/or heat). Upstream of the forming station, the upper surface of the metered quantity of mixture deposited on the conveyor belt is covered by a sheet or layer of protective material which prevents the pressure plate of the press from being soiled by the mixture.

In the past, this protective sheet material was paper, the use of which, however, was accompanied by some problems collateral to and downstream of the actual production line but none the less of considerable importance.

In fact, after the hardening of the resin, the paper sheet remained strongly adhering to the surface of the hardened slab and was quite difficult to remove therefrom so that a suitable operation for the mechanical removal of the protective paper was required during the finishing of the slab.

Subsequently, an improvement (described and claimed in European published Patent Application No. 0 786 325) was introduced, according to which the paper layer or sheet was replaced by a sheet of resilient material preferably rubber.

Upon completion of the hardening of the binding resin, the rubber sheet can thus in fact be pulled away from the suds of the finished slab and subsequently reused.

In the preferred embodiment, the support on which the mixture is deposited before being transferred to the station for compaction under vacuum and with vibration is also protected by a similar sheet of resilient material, particularly rubber.

After the forming stage, the mixture deposited on the support and enclosed between the two rubber sheets is in the form of a slab at the edges of which the two protective rubber sheets are joined together by their respective overlapping edges, substantially completely enclosing the raw slab which has been formed but not yet subjected to the step of hardening of the resin binder.

Since, during compaction, a portion of the mixture, albeit a minimal portion, inevitably forms a flash interposed between the two edges, this flash forms deposits on the rubber sheets after the resin binder has been hardened and these deposits are difficult to remove because the two rubber edges do not remain in contact with one another during the hardening step, so that the as yet unhardened flash is detached from the body of the product.

To prevent this problem, again in the previously known method, a release liquid is applied, immediately before use on the production line, to the two edges which are intended to meet. In spite of these measures, however, operations to clean the two rubber sheets, particularly in the region of the meeting edges are still necessary, although these operations are certainly less onerous than those previously connected with the removal of protective paper, they nevertheless necessitate a further operation in the production cycle in addition to that of the application of the release liquid to the two edges of the rubber sheets.

Moreover, in order to meet the peripheral edge of the lower sheet in the region of the edges of the formed raw mixture and of the adjacent side thereof the peripheral edge of the upper rubber sheet has to be deformed, overcoming the natural resilience which would tend to return it to the completely flat configuration.

The main object of the present invention is to solve these problems in an industrially advantageous manner.

A more specific object of the present invention is to improve the method and plant described above so as to avoid the need for the application of release liquid and at the same time to prevent the formation of deposits on the rubber sheets, which necessitate laborious cleaning operations.

These objects are achieved by the present invention by modifications both to the sheets and to the method of operation.

In the first place, the flat configuration of the lower sheet is replaced by a shaped configuration comprising a flat base and a peripheral frame projecting from the flat base for a predetermined height so as to define a seat of dimensions corresponding in plan to those of the slab to be produced, but the aforementioned peripheral frame is given a height which is lower by a predetermined amount than that of the final slab to be produced so that, after the compaction step, a space of predetermined depth remains between the peripheral edge of the upper sheet and the top of the aforementioned frame.

Excess mixture material is disposed in this space of predetermined depth during the step of vibratory compaction under vacuum and this material then remains attached to the edge of the slab during the hardening stage. When the final slab is pulled free of the two rubber sheets after the hardening of the resin binder, the hardened raw slab obtained has a peripheral frame of hardened material which can easily be removed during normal finishing operations for a slab of stony material.

As will become clearer from the detailed description with reference to the drawings, with the present invention, when the upper sheet is pulled away from the now hardened slab, the material forming the slab is easily separated from the rubber sheet since the force applied by the sheet to the surface of the slab is tangential so that, even at the edges of the slab, the rubber sheet is separated in the same manner and with the same results (that is, without the material of the slab remaining adhering to the adjacent surface of the rubber sheet) as were achieved for the central portion of the rubber sheet in the known method.

With reference row more specifically to the shaped configuration of the lower sheet, that is, the sheet holding the mixture initially deposited, its peripheral rim or, more precisely, the inner surface thereof which restrains the mixture material may adopt various configurations which are based on an analysis of the forces acting on the inner surface of the rim and at the same time on the consequences with regard to waste material at the edge of the slab.

In other words, the inner surface of the rim or frame of the lower sheet may adopt a shape or orientation which varies from a substantially vertical shape (in which case, the lower sheet is shaped like a box open at the top and with side walls perpendicular to the base surface) to a shape inclined in various ways (in which the lower sheet again forms a kind of box having an edge or fame with a flared arrangement).

Now, the force acting on the inner surface of the rim is approximately perpendicular thereto and, for inclined surfaces in general, can be broken down into two components, that is, a horizontal component and a vertical component, respectively. The horizontal component is that which causes deformation of the resilient rim (which results in a force opposing the detachment of the rubber from the adjacent surface of the slab).

On the other hand, the greater the outward inclination of the inner surface, the more easily the slab cart be extracted.

With regard to case of extraction of the slab, and in order to create a force component which squeezes the rubber rim towards the press plate, an inner surface of the rim of the lower sheet inclined outwardly as much as possible (basically with an external angle of between 90° and 0°) therefore seems preferable.

However, a greater inclination of the inner surface of the rim of the lower sheet corresponds to a greater width of the corresponding strip of waste material, whereas, if the peripheral rim is perpendicular to the base surface of the sheet, the waste material is reduced to the maximum possible extent, but the aforesaid horizontal component increases to the maximum extent. The inner surface of the frame or rim of the lower sheet should therefore be shaped in a manner such as to increase the vertical component or force to the maximum possible extent and at the same time to reduce the amount of waste material on the edge of the hardened slab to the maximum possible extent. This situation generally corresponds to a surface inclined at an angle of less than 90° and preferably of the order of 45°.

An upwardly concave curved shape of the inner or restraining surface of the rim or frame is also possible; in this case, most of the force is in fact discharged vertically onto the base rather than laterally.

BRIEF DESCRIPTION OF THE DRAWINGS

These and other aspects and advantages of the present invention will become clearer from the following detailed description given with reference to the appended drawings, in which:

FIG. 1 is a schematic view of the conventional production line to which the present invention is applied, FIG. 2 is a schematic view of the production step in which the make of granulated material and binding resin is educed in an envelope formed by two rubber sheets, FIG. 3 is a partial section showing the edge portion of the corresponding envelope in the case of the present invention, on an enlarged scale, FIG. 4 is a view similar to FIG. 3 showing a variant of the invention and, similarly, views of further variants of the present invention are shown in FIGS. 5, 6, 7 and 8, FIGS. 9, 10 and 11 are schematic views of a further variant of the invention.

FIG. 1 shows a line for producing slabs bound with resin from a mixture constituted by granulated material or sand and binding resin. This is the production line described in European published Patent Application No. 0 786 325 mentioned above, the text of which should be referred to for full information with regard to the line.

Figure 3A:
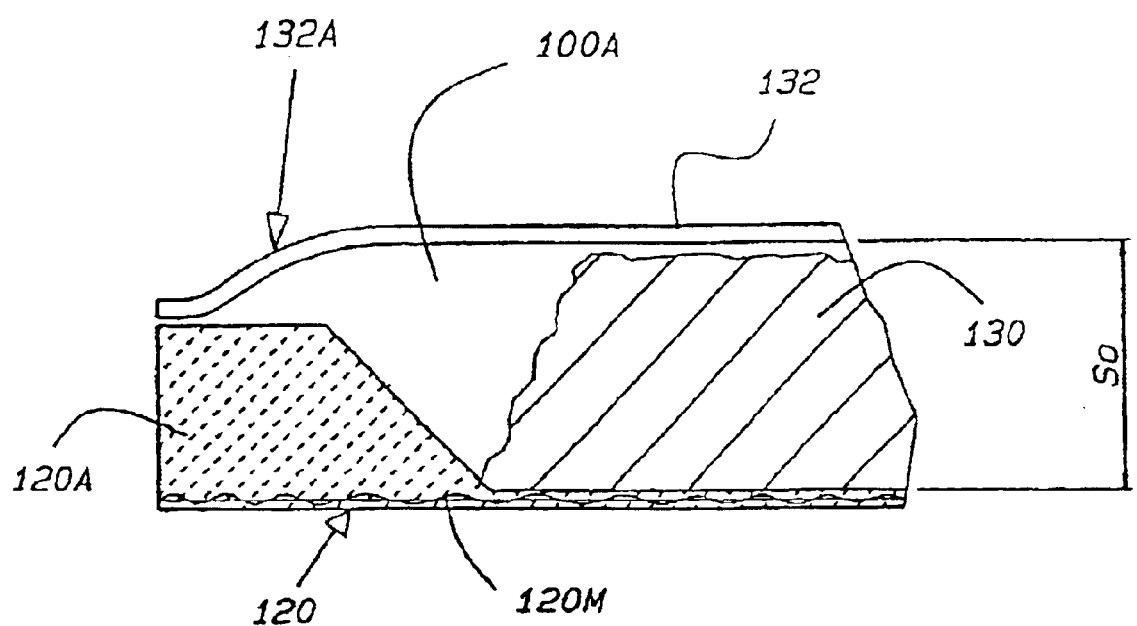
FIG. 3A is a view similar to FIG. 3 which shows the configuration actually adopted by the aforesaid edge portion in the implementation of the present invention.

It suffices herein to note that natural or synthetic rubber sheets, indicated 20, are placed at regular intervals on a conveyor belt 10 and constitute the lower sheets on which a metered quantity of mixture 26 prepared beforehand from granulated stone material and/or sand and hardenable binding resin is deposited in the station C, the metered quantity being disposed on the upper surface of the sheet 20 in the form of a layer 30 of uniform thickness having substantially the dimensions of the final slab to be produced.

In a station D downstream of the metering station C, a second rubber sheet 32 (the upper sheet), having dimensions larger than those of the layer of mixture 30 (as does the lower sheet 20) is deposited on the upper surface of the layer 30 and the peripheral edges of the two sheets 20 and 32 are made to meet (by deformation of the peripheral edge of the upper sheet 32) to form an envelope which encloses the layer of mixture 30 in the manner shown in FIG. 2.

It should be pointed out that, in the production line now described, the facing peripheral edges of the two sheets 20 and 32 are sprayed beforehand with a release liquid (as indicated by the reference numeral 21) and that, in the view of FIG. 2, the upper sheet is deformed so as to fit perfectly against the adjacent surface of the layer 30 which does not actually happen since the natural resilience of the sheet 32 opposes such a deformation of the upper sheet 32 (in the absence of means performance this specific function).

In fact, the peripheral edge of the upper sheet 32 will therefore adopt a downwardly inclined arrangement, leaving an irregular space which is filled by excess mixture during vibratory compaction, even though the compaction press has a compaction and pressure plate which is shaped so as to fit closely against the upper sheet even in the region of the sides of the layer 30. With reference now to FIG. 3, this shows in section a portion of the envelope formed in the case of the present invention by the upper and lower rubber sheets and by the layer of mixture enclosed between them.

For convenience of reference, the reference numerals used in FIGS. 1 and 2 are used again, increased by 100, for corresponding components in FIG. 3.

Thus, in FIG. 3, the upper rubber sheet is indicated 132, the lower rubber sheet is generally indicated 120, and the mixture, which at the output of the station for vibratory compaction under vacuum (indicated E in FIG. 1) is enclosed between the two aforesaid sheets, is indicated 130.

FIG. 3A shows the same mixture before it enters the vibratory compaction station so that it can be appreciated that, before this operation, the mixture has a thickness $S_0$ decidedly greater than S and, that a space 100A, also defined by a temporary deformation of the peripheral edge 132A of the upper sheet 132, remains in the region of the outer edge of the mixture between the upper rubber sheet 132 and the peripheral rim or frame 120A of the lower sheet 120.

As can be seen from FIG. 3, the upper sheet 132 is arranged in a completely flat configuration on the upper surface of the layer of compacted mixture 130 on which it bears whilst, in the region of the peripheral edge 132A, it is separated from the peripheral rim or frame 120A of the lower sheet 120 by a space or cavity 100 of predetermined depth equal to the difference h between the thickness S of the mixture 130 and the thickness or height X of the peripheral rim 120A of the lower sheet 120.

As will be seen from the following, physical contact between the two corresponding edges 132A and 120A of the two sheets 132 and 120 is prevented by the provision of the space 100, which defines a cavity of regular shape and very limited depth into which the excess mixture can escape at the compaction stage. After the slab has hardened, this excess mixture constitutes a flash which can easily be removed during the finishing of the completed slab.

As can also be seen in FIG. 3, the lower sheet is shaped and comprises a flat base 120B and the aforementioned frame or rim 120A which has an inclination of 45°; in this embodiment the portion 120E of the final slab enclosed between the inclined surface 120C and the vertical section identified by the broken line 120D constitutes waste material in the sense that it will have to be removed from the final slab at the finishing grinding stage, hearing in mind, in particular, that the surface in contact with the base 120B of the lower rubber sheet is that which constitutes the visible face in the final slab.

It will thus also be understood why the inclination of the surface of the peripheral side or frame 120A of the lower sheet cannot adopt large values (which favor the separation of the lower rubber sheet) since an in this inclination increases the effect of the waste portions 120E. With regard to the material of the two sheets 132 and 120, it is worth nothing that the lower sheet should preferably be inextensible so as to withstand the tensile forces to which it is subject during pressing, and which are generated by the horizontal thru on the shaped rim The lower sheet preferably has a composite structure in the sense that it is constituted by an intermediate layer 120M of cloth or fabric of non-deformable material such as Kevlar, polyester or nylon, enclosed between two rubber layers. Moreover, to prevent hysteresis phenomena (that is, persistence of any extension), the cloth or fabric undergoes a pre-tensioning process.

Finally, the rubber sheet should also be able to withstand the temperatures of the hot catalytic hardening step which are of the order of 80–150° C.

With regard to the upper sheet 132, however, this does not necessarily have to be composite in the same manner as the lower sheet but is preferably made of rubber of the sane composition as that forming the rubber layers covering the inextensible cloth of the lower sheet.

The lower sheet should also allow the peripheral rim to be gripped by pincer means as provided for, for example, in the method and plant described in International Patent Application No. PCT/EP98/02258 filed on Apr. 11, 1998 in which the assembly constituted by the lower and the upper sheet which enclose the layer of mixture is gripped in the region of the lower edge for the handling operations to which the assembly has to be subjected on the production line.

Figure 5:
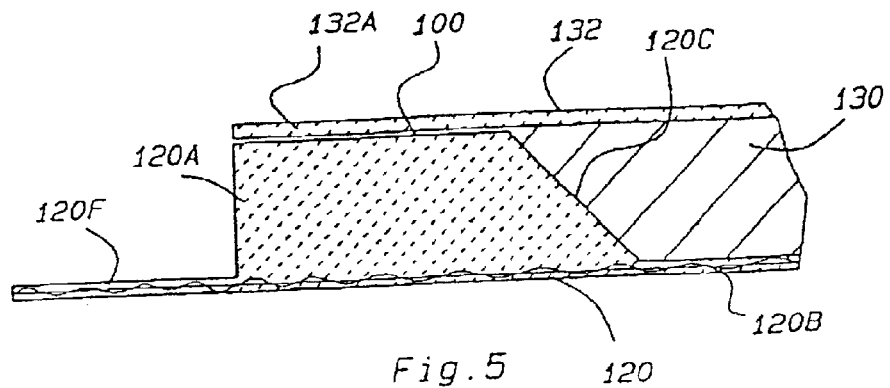

In this case, the lower sheet 120 is preferably shaped as shown in FIG. 5, thus having an outer gripping appendage 120F.

With reference now to FIG. 4, it can be seen that the shape of the inner surface of the rim or frame 120A is modified in comparison with FIG. 3 and, in this embodiment (as indicated by the reference 120G) has an upwardly concave curvature. In fact, the size of the portion 120E of waste material is thus reduced in comparison with the solution of FIG. 3, but without a substantial reduction in the vertical component of the force acting between the lateral surface of the frame 120A and the side of the slab of stoney material.

With the solutions according to the present invention considered up to now, the following advantages are achieved:

(1) the upper sheet is clean after detachment from the hardened slab;
(2) the lower sheet is also substantially clean and above all free of deposits of mixture after removal of the slab;
(3) the pressure plate of the press no longer has to be equipped with the peripheral rim or frame for restraining the upper sheet so that its peripheral edge meets that of the lower sheet;
(4) changing of the size of the slab is simplified since it suffices to change the dimensions of the lower sheet without altering the plate of the vibratory compaction press.

Figure 6:
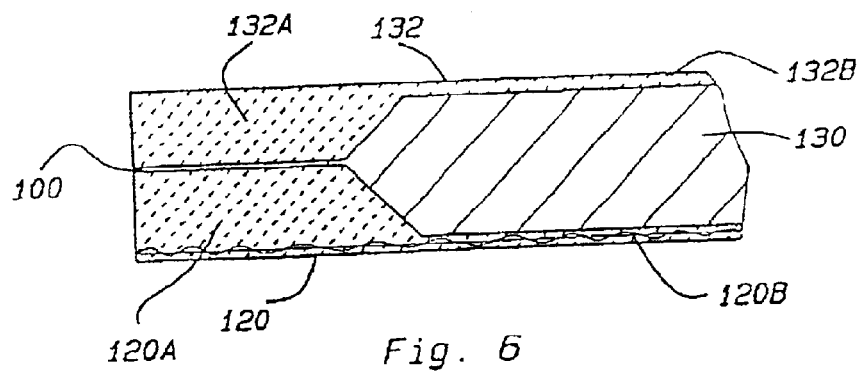
Figure 7:
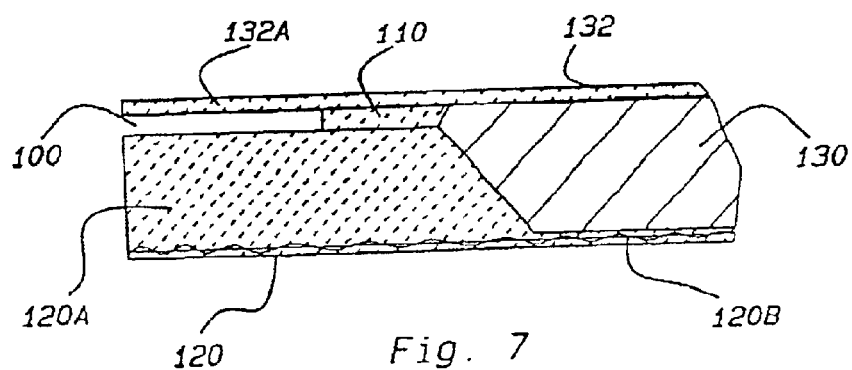
Figure 8:
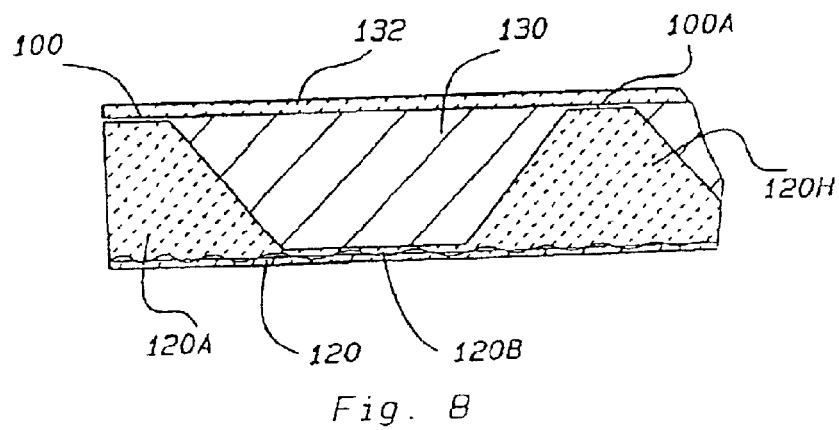

FIGS. 6, 7 and 8 illustrate further variants of the present invention. In the solution shown in FIG. 6, the upper and lower sheets are formed as mirror images of one another so that the empty space or cavity is formed in the region of the horizontal median plane of the layer of mixture.

In this embodiment, an accurate selection of the dimensions of this space and, in particular, of its depth, in fact enables an adequate pressing action to be maintained but at the same enables the thin peripheral flash which in this embodiment would be disposed along the median plan, to be reduced.

Naturally in FIG. 6, the reference numerals relating to the upper sheet have been supplemented by those of parts corresponding to parts of the lower sheet in the version of FIG. 3.

In the variant of FIG 7, on the other hand there is provision for the insertion of an additional insert 110 which is fixed to the lower surface of the upper sheet in the region in which the peripheral flash would otherwise form. In this embodiment, the thickness of the insert 110, which is preferably made of rubber, particularly soft rubber, is also calculated so as to permit adequate pressing but at the same time to prevent the formation of the aforementioned flash To provide an order of magnitude for this thickness, it should be of the order of 2 mm. As can also be seen in FIG. 7, it is preferable for the inner surface of the insert 110 to be inclined slightly outwardly so as to favor the detachment of the upper sheet 132.

The solution shown in FIG. 8, however, relates to the possibility of forming suitable recesses or even holes having specific purposes in the final slab. A typical case is that of so-called kitchen "worktops" (support slabs or surfaces) which require holes for the fixing of utensils or recesses for fixing to underlying units.

In this case, in the solution shown, a projection 120H of a height equal to that of the rim or frame 120A of the lower sheet 120 extends upwards from the flat base 120B of the said lower sheet 120, thus forming a second cavity 100A.

This technique may be used, for example, to form decorative designs or even writing on the visible face of the final slab.

Finally, it is also possible by means of the present invention to produce slabs already divided into a plurality of smaller tiles or blocks.

Figure 9:
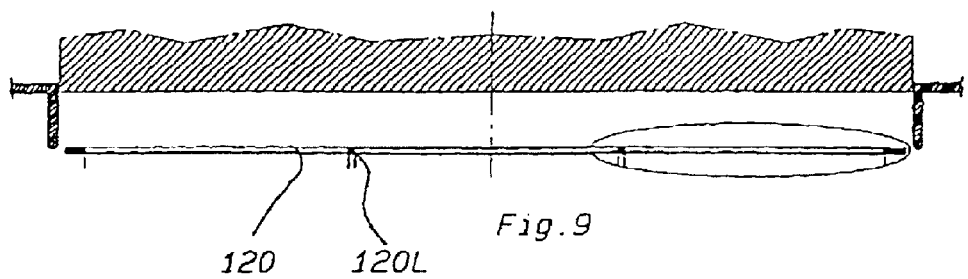
Figure 10:
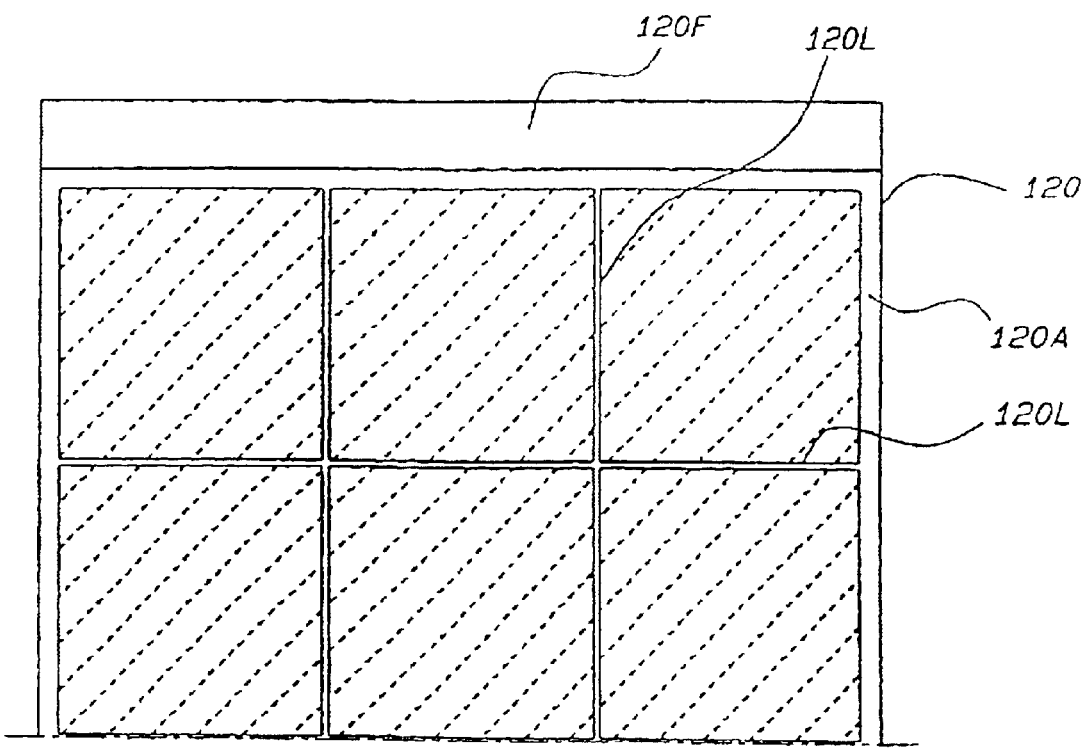
Figure 11:
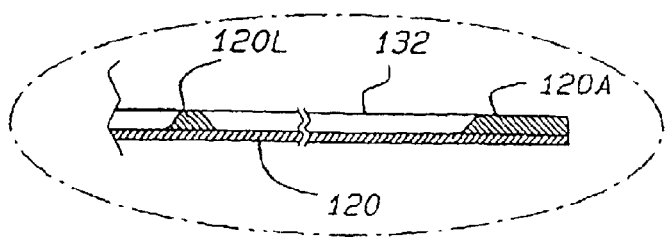

For this purpose, as shown in FIGS. 9–11, one of the two sheets, preferably the lower one, carries a lattice-like structure 120L projecting from the base 120B.

The final sheet will thus automatically be divided, into a plurality of uniform blocks which are separate from the outset or are joined by a very thin connecting flash which can easily be removed in the course of the usual finishing operations.

The invention has been described with reference to preferred embodiments thereof, upon the understanding that conceptually and mechanically equivalent modifications and variations are possible and foreseeable without departing from the scope thereof.

What is claimed is:

1. Method of producing slabs made of granulated stone materials and/or sand bound with a hardenable resin, of the type in which a mixture of granulated stone material and/or sand and hardenable resin is spread on a support so as to form a layer of substantially uniform thickness, the support being protected by a sheet material interposed between the upper surface of the support and the layer of mixture, the support is transferred to a station for vibratory compaction under vacuum, care being taken to protect the upper surface of the layer of mixture with a sheet material superimposed on the layer before it reaches the station and, after the vibratory compaction under vacuum, the support with the layer of compacted mixture is transferred to a hardening stations, the said sheet material also being highly resilient, characterized in that the flat configuration of the lower sheet is replaced by a shaped configuration comprising a flat base and a peripheral frame projecting from the said flat base for a predetermine height so as to define a seat of dimensions corresponding in plan to those of the slab to be produced, the aforementioned peripheral frame having a height which is lower by a predetermined amount than that of the final slab to be produced so that, after compaction, a space of predetermined depth remains between the peripheral edge of the upper sheet and the top of the aforementioned frame.

2. Method according to claim 1, characterized in that the lower sheet is constituted by a cloth of inextensible fabric covered with a layer of rubber on both sides.

3. Method according to claim 2, characterized in that the cloth of inextensible fabric is subjected to a pretensioning treatment before being covered with the layers of rubber.

4. Method according to claim 1, characterized in that the rubber which covers the said inextensible cloth can withstand temperatures of between 80 and 150° C. and chemical agents.

5. Method according to claim 1, characterized in that the said upper sheet has a configuration which is a mirror image of that of the said lower sheet so that the said empty space or cavity is located in the vicinity of the horizontal median plane of the final slab.

6. Method according to claim 1, characterized in that an insert is fixed to the lower surface of the said upper sheet in order partially to fill the empty cavity or space formed between the peripheral edges of the said lower and upper sheets when they enclose a metered quantity of mixture.

7. Method according to claim 1, characterized in that projections extend from the said flat base of the lower sheet and/or from the surface of the said upper sheet which comes into contact with the said mixture in order to form recesses or holes in the finished slab.

8. Method according to claim 1, characterized in that, in order to produce slabs already divided into a plurality of blocks or tiles, one of the two sheets, preferably the lower one, carries a lattice-like structure projecting from the surface facing towards the mixture.

9. Shaped sheet usable for the production of slabs from a mixture constituted by granulated stone material and/or sand and by a binding resin according to the method of claim 1, characterized in that it comprises a flat base and a peripheral frame projecting from the said flat base for a predetermined height so as to define a seat of dimensions corresponding in plan to those of the slab to be produced, the said predetermined height being lower by a predetermined amount than that of the final slab to be produced so that, after compaction, a space of predetermined depth remains between the peripheral edge of the upper sheet and the top of the aforementioned frame.

10. Shaped sheet according to claim 9, characterized in that the said rim or frame has an inner surface, inclined at an angle of less than 90° to the vertical plane, for contact with the said mixture deposited on the flat base.

11. Shaped sheet according to claim 10, characterized in that the said inclination of the said contact surface is between 45 and 90°.

12. Shaped sheet according to claim 9, characterized in that the said rim or frame has an upwardly concave curved inner surface for contact with the said mixture.

13. Shaped sheet according to claim 9, characterized in that it has a composite structure constituted by a cloth of inextensible material covered with a layer of rubber on both sides.

14. Shaped sheet according to claim 13, characterized in that the said cloth of inextensible material is subjected to a pretensioning treatment.

15. Shaped sheet according to claim 9, characterized in that a flat appendage which can be gripped by pincer pulling and transfer means is provided along at least one side of the sheet.

16. Shaped sheet according to claim 9, characterized in that, in order to form slabs divided in advance into a plurality of tiles or blocks, a lattice-like structure is provided, projecting from the surface of at least one of the said sheets facing the mixture.

17. Shaped sheet according to claim 9, characterized in that projections for forming recesses or holes in the finished slab extend from the said flat base of the said lower sheet which contacts the said mixture.

* * * * *